US008662113B2

(12) United States Patent
Bell et al.

(10) Patent No.: US 8,662,113 B2
(45) Date of Patent: Mar. 4, 2014

(54) DEVICE AND METHOD FOR STRANDING A LONG WINDING MATERIAL

(75) Inventors: Bertram Bell, Kerpen (DE); Bernhard Enzensberger, Wald (DE); Helmut Lämmermann, Schwabach (DE)

(73) Assignee: Maschinenfabrik Niehoff GmbH & Co. KG, Schwabach (DE)

( * ) Notice: Subject to any disclaimer, the term of this patent is extended or adjusted under 35 U.S.C. 154(b) by 1228 days.

(21) Appl. No.: 11/658,639

(22) PCT Filed: Jul. 25, 2005

(86) PCT No.: PCT/EP2005/008078

§ 371 (c)(1), (2), (4) Date: Sep. 16, 2008

(87) PCT Pub. No.: WO2006/010586

PCT Pub. Date: Feb. 2, 2006

(65) Prior Publication Data

US 2009/0007982 A1 Jan. 8, 2009

(30) Foreign Application Priority Data

Jul. 26, 2004 (DE) ......................... 10 2004 036 161

(51) Int. Cl.

| | |
|---|---|
| ***H02G 1/12*** | (2006.01) |
| ***B21F 29/00*** | (2006.01) |
| ***B21F 45/00*** | (2006.01) |
| ***B21F 9/02*** | (2006.01) |
| ***B21F 15/02*** | (2006.01) |
| ***B21F 7/00*** | (2006.01) |
| ***B21F 15/04*** | (2006.01) |

(52) U.S. Cl.

USPC .................. 140/39; 140/1; 140/30; 140/93.6; 140/111; 140/113; 140/118; 140/149

(58) Field of Classification Search

USPC ......... 140/1, 30, 39, 93.6, 111, 113, 118, 149

See application file for complete search history.

(56) References Cited

U.S. PATENT DOCUMENTS

| | | | | |
|---|---|---|---|---|
| 2,464,860 A * | 3/1949 | Green | ........................... | 140/149 |
| 3,847,190 A * | 11/1974 | Forester | ........................ | 140/149 |
| 4,970,371 A * | 11/1990 | Montgomery, Sr. | .......... | 140/149 |
| 6,289,944 B1 * | 9/2001 | Frommenwiler | ............. | 140/149 |
| 6,427,432 B1 | 8/2002 | Pourtier | | |

* cited by examiner

*Primary Examiner* — Dana Ross
*Assistant Examiner* — Justin V Lewis
(74) *Attorney, Agent, or Firm* — Greer, Burns & Crain, Ltd.

(57) ABSTRACT

A stranding of long winding material using a substantially cylindrical rotary body. The rotary body includes a first passage for guiding a first winding material through the cylindrical rotary body and a second passage for guiding a second winding material through the cylindrical rotary body. The first passage connects a first offset inlet on a first end side of the rotary body to a first offset outlet on a second end side of the rotary body, which opposes the first end side. The second passage connects a second input, arranged on a surface of the rotary body extending between the two end sides, to a second offset output on the second or first end side of the rotary body.

20 Claims, 7 Drawing Sheets

DEVICE AND METHOD FOR STRANDING A LONG WINDING MATERIAL

BACKGROUND

The present invention relates to a device or an apparatus, as well as a method for stranding long winding materials, in particular metal winding materials, such as wires, lacings, cables as well as insulated conductors, such as small wires or the like.

A complete assembly for stranding long winding materials, which includes an apparatus for stranding long winding materials as well as a method for stranding long winding materials making use of the apparatus, is disclosed in U.S. Pat. No. 6,427,432 B1.

The total assembly of US '432 is a so-called "lyre-type horizontal pairing machine", abbreviated "PHL", and comprises a horizontally arranged rotary flyer-type payout system with a rotary flyer. A payout system is arranged within the body supporting the rotary flyer and is decoupled from the rotation of the flyer and serves for tangential payout of a first strand.

A second strand is supplied by a second payout system, which is arranged in drawing direction before the rotary flyer payout system and is guided over the rotary flyer of the flyer-type payout system.

At the end of the flyer-type payout system, a device is arranged for stranding the first and second strands. It is a stranding drum, which is a functionally important element for the assembly of the two individual strands.

This stranding drum, a cylindrical rotary body, comprises a first passage for guiding the first wire or strand through the stranding drum and a second passage for guiding the second wire or strand through the stranding drum.

The first passage interconnects a first central inlet on the inlet end side of the stranding drum with a first eccentric or offset outlet of the outlet end side of the stranding drum. The second passage interconnects a second offset inlet on the inlet end side of the stranding drum with a second, also offset outlet on the outlet end side of the stranding drum.

After passing through the stranding drum, the first and second wires are stranded together at a stranding point.

A drawback of the "PHL" system appears to be that both of the individual wires or strands must pass the entire length of the stranding drum, due to the constructive configuration of the "PHL". This requires that the stranding drum on the whole can only be arranged in drawing direction following the rotary flyer-type payout system. This would oppose a general need for a compact form of the entire stranding assembly.

A further drawback of the "PHL" system, as described in the embodiment, in particular for the configuration of the stranding drum, can only operate as an assembly for stranding two wires. An operation of the rotary flyer payout system as a back twisting device for individual wires appears only possible for "PHL" with correspondingly complicated re-fitting of the "PHL". The "PHL" of US '432 therefore appears to be less flexible.

The object of the present invention is therefore to provide an apparatus as well as a method for stranding long winding materials, which allows a more compact construction of the entire stranding assembly as well as allowing a stranding assembly which is more flexible in use.

SUMMARY

The apparatus for stranding of long winding materials according to the present invention comprises a substantially cylindrical rotary body with at least one first passage for guiding a first winding material through the cylindrical rotary body and with at least one second passage for guiding a second winding material through the cylindrical rotary body. The first passage interconnects a first offset or peripheral inlet on a first end side of the rotary body with a first offset outlet on a second end side of the rotary body, opposite the first end side.

The second passage connects a second inlet, arranged on a surface of the rotary body extending between the two end sides, with a second offset outlet on the second or first end side of the rotary body.

According to the method of stranding long winding material, a first winding material is guided through a first passage of a substantially cylindrical rotary body and a second winding material is guided through a second passage of the substantially cylindrical rotary body.

The first and second winding materials, after passage through the substantially cylindrical rotary body, are stranded at a stranding point.

The first passage connects a first offset inlet on a first end side of the rotary body with a second offset outlet on a second end side of the rotary body, opposite the first end side.

The second passage connects a second inlet, arranged on a surface of the rotary body (cylindrical surface) extending between the two end sides, with a second offset outlet on the second end side of the rotary body.

The terms "inlet" and "outlet" used here in conjunction with the passage of the winding material through the rotary body should not be understood as limited to a passage of the winding material in this inlet-outlet direction, i.e. in the direction from the inlet to the direction of the outlet. A passage of the winding material in the opposite direction, i.e. from the outlet in the direction of the inlet is also possible.

Furthermore, the terms "offset" or "peripheral" or an "offset or peripheral inlet/outlet" are understood in that a radial displacement or radial distance (of the inlet/outlet) is present with respect to the rotational axis or center axis of the substantially cylindrical rotary body.

The other terms used here "centrally" or "central" correspondingly mean that no radial displacement or no radial distance (of an inlet/outlet) is present to the rotational axis or center axis of the substantially cylindrical rotary body and that such a central inlet or outlet lies on the rotational axis or center axis of the substantially cylindrical rotary body.

Further preferred configurations and embodiments of the invention result from the dependent claims.

The described embodiments and/or configurations discussed below refer both to the method and also the apparatus.

The stranding of several wires or strands is a further embodiment, by which one, two or even more first passages and/or one, two or even more second passages are provided respectively for guiding further winding materials through the cylindrical rotary body.

With at least one further first passage and one further second passage, the second offset outlet of the second passage can be arranged opposite the second offset outlet of the at least one second passage.

In a further preferred embodiment, the second offset outlet of the second passage and the first offset outlet of the first passage can be arranged on the same end side of the cylindrical rotary body.

In a further preferred embodiment, the two offset outlets are arranged such that they have the same radial distance from a rotational axis of the cylindrical rotary body and are arranged oppositely at 180°.

In a further preferred embodiment, the first and/or second passages are substantially parallel, in particular at the same radial distance to the rotational axis of the substantially cylindrical rotary body.

Particularly advantageous, especially for a compact construction of the stranding assembly is when the cylindrical rotary body is part of a rotary shaft of a rotary flyer, in particular of a rotary flyer payout system, and/or rotates with a rotary flyer, in particular a rotary flyer payout system or is connected thereto for rotation. In these cases, the stranding device or the rotary body is integrated into the rotary flyer payout system and/or is an integral element of a rotary flyer payout system.

A strand guidance can be improved and frictional losses avoided if a guiding device is provided to input the second winding material at the second inlet, in particular a deflection roller.

In a further preferred embodiment, a third passage is provided for guiding a third winding material through the cylindrical rotary body. This third passage can be configured such that it connects a third central inlet at the first or second end side of the rotary body with a third outlet, arranged on the surface of the rotary body (cylindrical surface) between the two end sides.

It is noted that the third winding material can also simultaneously be guided with the first and/or second winding material through the rotary body.

However, it is preferred when the third winding material instead of the first and the second winding materials is guided in an alternative operation through the rotary body. For example, in normal operation the first and second winding materials are passed through the rotary body and a stranding of the first and second winding materials takes place. However in the alternative operation, the third winding material instead of the first and second winding materials passes through the rotary body and a back twisting of the third winding material takes place.

A guiding device at the outlet of the third winding material can also be provided, in particular a deflection roller.

Furthermore, the first and the third and/or the second and the third and/or the first, the second and the third passage can run substantially parallel to one another and/or to a rotational axis of the substantially cylindrical rotary body.

The substantially cylindrical rotary body can be provided of a metallic material, such as steel or aluminum and/or the passage through the rotary body can be a (longitudinal) bore or a (longitudinal) groove or the like.

The special flexibility allows applications in the scope of stranding or pre-stranding at least two winding materials and also in the scope of back twisting of one of the individual winding materials.

The first winding material is guided through the first passage for the purpose of stranding, in particular pre-stranding, of a first winding material, in particular a first strand, and the second winding material, in particular a second strand, especially for metallic first and second winding materials, such as wires, lacings, cables and the like. The second winding material is guided through the second passage. After passing through the cylindrical rotary body, the first and second winding materials are stranded at a stranding point.

When stranding or in particular when pre-stranding of the first and second winding materials, it can be provided that the second winding material be guided prior to the second passage in drawing direction over a rotary flyer of a rotary flyer payout system and/or that the first winding material prior to being passed through the first passage be drawn off from a payout system of the rotary flyer payout system as a tangential payout.

Furthermore, when stranding, in particular when pre-stranding, of the first and the second winding material, it can be provided that the second winding material before being guided over the rotary flyer of the rotary flyer payout system in drawing direction is drawn off from a further rotary flyer payout system as a further tangential payout system.

The rotary flyer payout system or systems can be arranged horizontally or vertically.

The third winding material is guided through the third passage when used for back twisting of the third winding material, in particular a third strand. After passing through the cylindrical rotary body, the third winding material is guided over a rotary flyer of a rotary flyer payout system, upon which the third winding material receives a back twisting.

The rotary flyer payout system in this case can also be arranged horizontally or vertically.

When back twisting the third winding material, it can be provided that the third winding material before passing through the cylindrical rotary body in drawing direction is drawn off of a drawing device of the rotary flyer payout system.

Preferably, the apparatus, the method or its embodiments can be combined with or supplemented with detection means and/or regulation means for the winding material tension and/or drawing force of the winding material.

A first force measuring device, in particular a load cell force sensor can be provided for measuring a tensile force and/or tension in a winding material. The first winding material can be guided over the sensor before passing through the first passage of the substantially cylindrical rotary body.

In addition, a third force measuring device can be provided, in particular a third load cell or force sensor, also for measuring a tensile force and/or tension in a winding material. In addition, a stranded product out of the first and second winding material can be guided over the sensor after passing through the substantially cylindrical rotary body.

In a further embodiment, a second force measuring device, in particular a second load cell or force sensor, can be provided for measuring the tensile force and/or tension in a winding material through which the second winding material is guided before passing through the second passage of the substantially cylindrical rotary body.

When detecting and/or regulating a winding material tension and/or drawing force, in particular for detecting a desired drawing force of the second winding material and/or regulating a second drawing force of the second winding material, a first drawing force of the first winding material can be measured with a first force measuring device and/or with the second force measuring device a second drawing force of the second winding material.

The tensile force in the stranded product can be measured with the third force measuring device.

The desired or set drawing force of the second or first winding material can be determined and/or the second or first drawing force of the second winding material can be regulated by using the first drawing force of the first winding material or the second drawing force of the second winding material and the tensile force in the stranded product.

BRIEF DESCRIPTION OF THE DRAWINGS

Further advantages, features and applications of the present invention can be taken from the following description of embodiments in conjunction with the attached drawings and the list of reference numerals. The drawings show components and elements of stranding assemblies in generally used, common illustrations understandable for the skilled person.

Shown in schematic presentation.

DETAILED DESCRIPTION OF THE PREFERRED EMBODIMENTS

Figure 1:
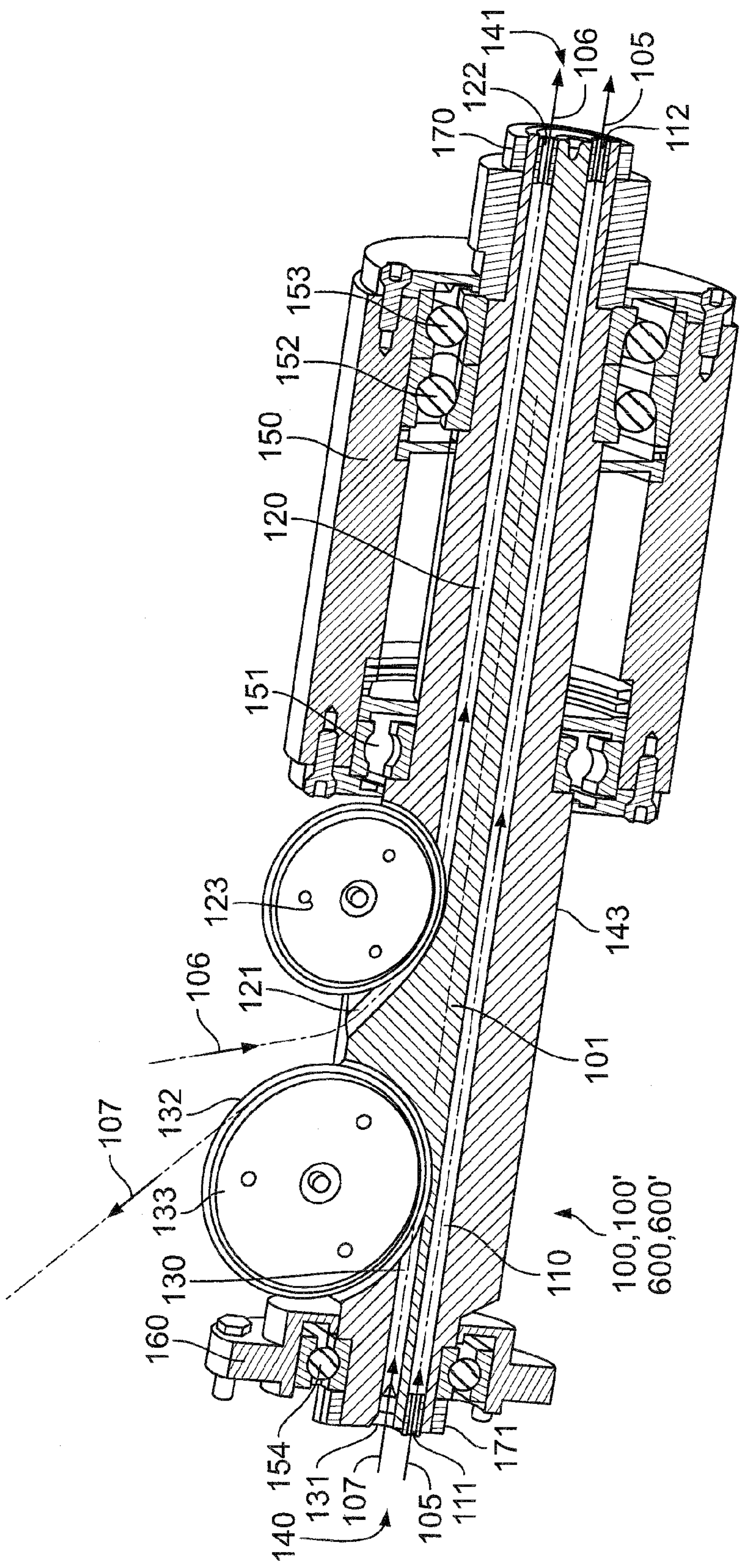
FIG. 1 is a cross sectional drawing of a lower rotary shaft of a vertical rotary flyer payout system with integrated stranding element according to a first and/or second embodiment.

The following embodiments comprise in particular a stranding element 100 or 100' (see FIG. 1) for combining two individual strands 102 and 103 in this case (see FIG. 2), which is formed as an integral part of a lower rotary shaft 600 or 600' of a vertically arranged rotary flyer payout system, in the present embodiments a first 650 and a second 660 rotary flyer payout system.

It is remarked that the stranding element 100 or 100' as described here for this embodiment in a vertical rotary flyer payout system can be used correspondingly in a horizontal rotary flyer payout system.

The stranding element 100 or 100', as to be discussed below for the embodiments, is employed for pre-stranding (a three-fold total stranding) of the first 102 and the second 103 strands (embodiment 1), employed for a back twisting of a first 102' or a second 103' strand (embodiment 2) as well as employed for a stranding in combination with a strand tension/drawing force regulation of the third strand 103 (embodiment 3).

Embodiment/Applications In Review

Figure 5:
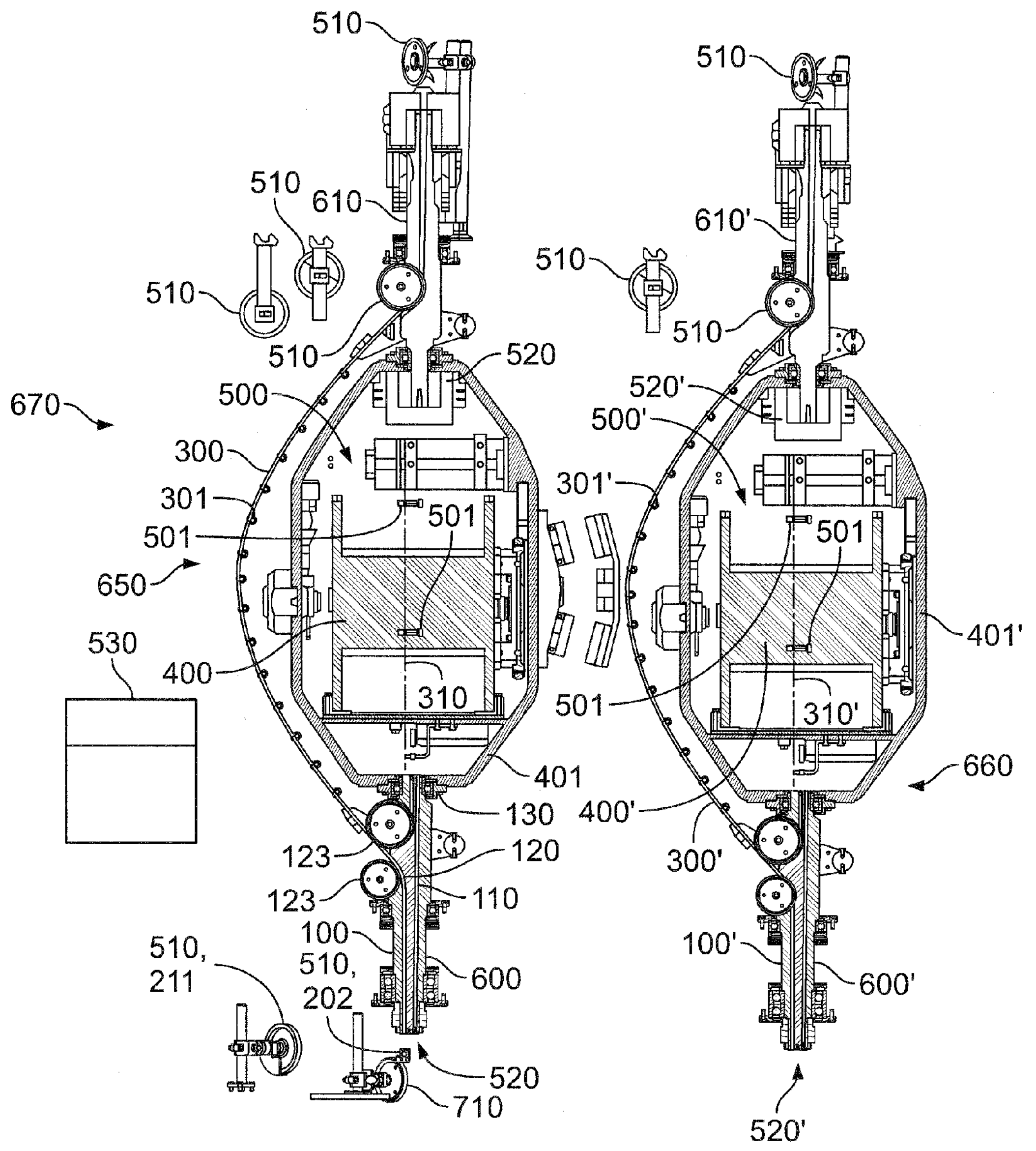
FIG. 5 is an overview of a first portion of a stranding assembly with two vertical rotary flyer payout systems used for (pre) stranding of two strands as well as for back twisting one strand according to a first and/or second embodiment.
Figure 6:
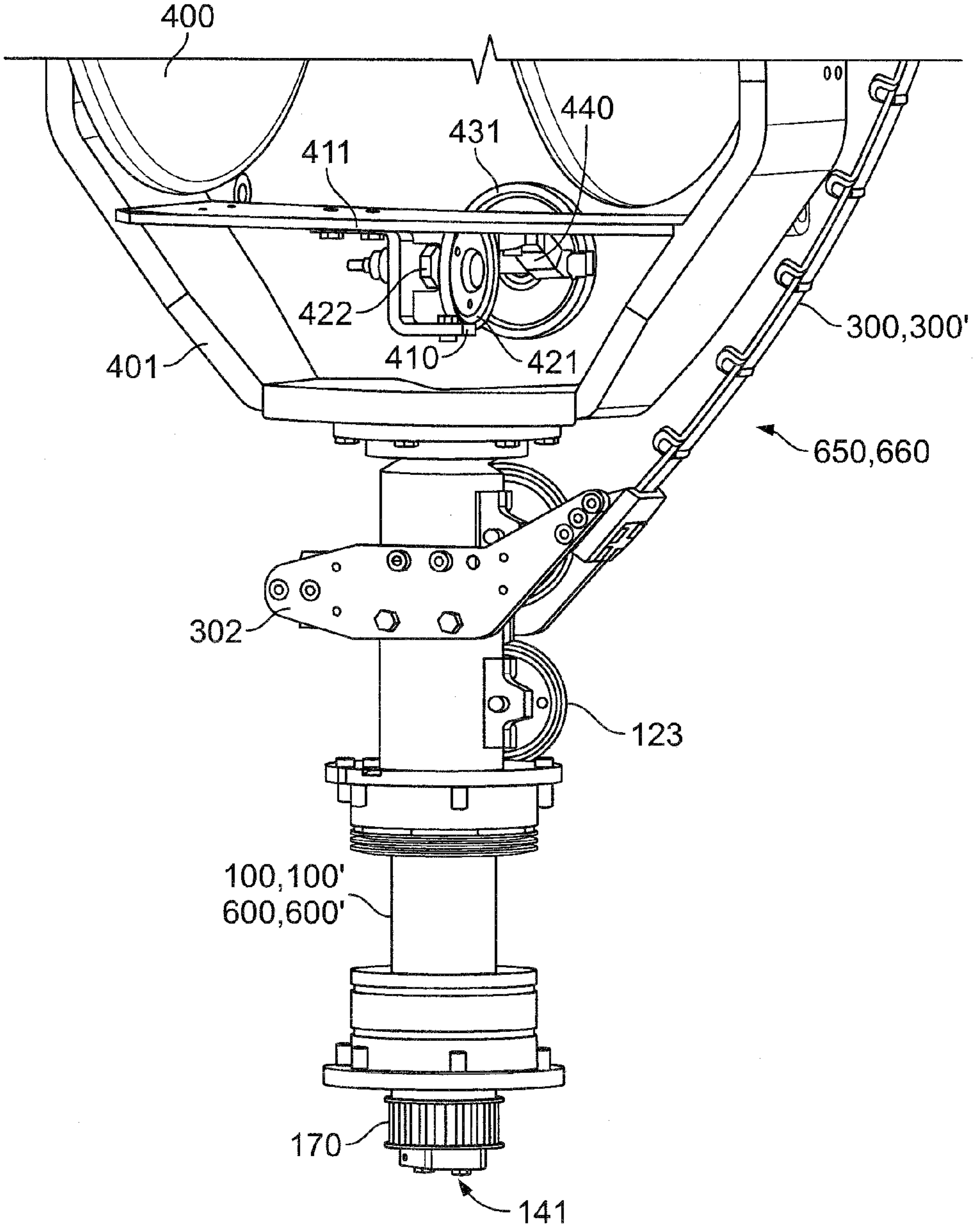
FIG. 6 is an illustration of a lower portion of a vertical rotary flyer payout system with lower rotary shaft with integrated stranding element according to a first and/or second embodiment.

FIG. 5 shows an overview of a portion 670 of a combined total stranding assembly, which can be used for the pre-stranding of the first 102 and the second 103 strand (embodiment 1), also for back twisting of the first 102' or the second 103' strand (embodiment 2) as well as also for the pre-stranding in combination with strand tension regulation and drawing force regulation for the second strand 103 (embodiment 3).

The described strand tension regulation in the embodiment 3 can however also be the protected subject matter alone, without the constructive details of the stranding assembly according to embodiment 1 or the back twisting device of embodiment 2.

Initially, the essential elements of the portion 670 shown in FIG. 5 of the entire stranding assembly are described, which are also illustrated and where reference is also made to the further FIGS. 1 to 4 and 6.

FIG. 5 shows a first 650 as well as a second 660 vertically arranged rotary flyer payout system, configured as a single flyer system with a rotatable flyer 300 or 300', for example a sleeve winder. Guide rollers 301, 301' for strand guidance are arranged on the rotary flyers 300, 300'. The rotary flyers 300, 300' are rotatably mounted through a lower 600, 600' and an upper 610, 610' rotary shaft and are driven by a drive unit 520, 520'.

The stranding element 100, 100' is integrated into the lower rotary shaft 600, 600' or the lower rotary shaft 600, 600' is configured such that it simultaneously acts as the stranding element 100, 100'.

The two rotary flyer payout systems 650, 660 are arranged parallel to one another and can be operated and driven in synchronized manner, as in the stranding operation in embodiment 2.

Within the rotary body, spanned by the rotary flyers 300, 300', and on their rotational axes 310, 310' is a dancer-regulated payout system 500, 500', which comprises a payout spool 400, 400' (payout/pick-up spool) mounted in a spool frame 401, 401'.

The rotary flyer 300, 300' and the payout system 500, 500' can be decoupled from one another by decoupling a rotary flyer drive, as in embodiment 1 in back twisting operation.

In stranding operation (see embodiment 1), the first strand 102 is paid out from the payout spool 400 and in the back twisting operation (embodiment 2), the first strand 102' is paid out under dancer regulation and with nearly constant tensile force (see embodiment 3).

In stranding operation (embodiment 1) the second strand 103 is paid out from the payout spool 400' and in the back twisting operation (embodiment 2) the second strand 103' is paid out in dancer regulation and with nearly constant tensile force (embodiment 3).

Corresponding means are provided for paying out the respective strands on the corresponding payout systems 500, 500' or the respective payout spools 400, 400', such as a guiding nipple 410, deflection rollers and guide rollers 421, 431 as well as associated fastening devices 410, 422, 440.

In the system 670 shown in FIG. 5, as well as in the FIG. 1 to 4 and FIG. 6, various strand guiding elements are illustrated such as the guiding nipple 501, deflection rollers and pulleys 510 and guiding rollers 301 for guiding the strands 102, 102' or 103, 103'. The deflection rollers and pulleys 510 in the embodiments preferably have a diameter of at least 120 mm.

To minimize the total strand drawing forces in the assembly or system 670, a single disc drawing device with a pressing belt and dancer regulation 530 is installed for the drawing action.

Furthermore, the two dancer regulated payout systems 500, 500' of the system 670 each comprise a device for tensile force or strand tension measurement, here a first and a second force sensor 700, 701, which are arranged in drawing direction directly following the payout position of the respective strands 102, 102' or 103, 103' in the corresponding rotary flyer payout system 650, 660. The first 102 or the second 103 strand is passed over these first or second force sensors 700, 701 and their tensile force or their strand tension is measured.

In addition, a further, in this case a third, force sensor 710 is provided, which is arranged in drawing direction following the stranding element 100. The stranded product out of the first 102 and the second strand 103 (embodiment 1) is passed over this sensor and its tensile force or strand tension is measured.

Stranding element 100 or 100' (see in particular FIG. 1 or FIGS. 2 to 6).

The stranding element 100, 100', as part of the lower rotary shaft 600, 600', as shown in FIG. 1 to 6, comprises a longitudinally extended substantially cylindrical component rotationally mounted about a rotational axis 101, which is connected by means of a fastening element 302 with the rotary flyer 300, 300' rotating about the rotational axis 101 for common rotation.

Mounting elements 150, 160 with ball bearings 151 to 154 are provided for mounting the lower rotary shaft 600, 600' or the stranding elements 100, 100'. In addition, toothed belt rings 170, 171 are provided on the lower end 144 and the upper end 140 of the lower rotary shaft 600, 600' or the stranding element 100, 100'.

The stranding element 100, 100' comprises three passages or bores 110, 120 and 130 for guiding the first 102 and the second 103 strand or the first and second strand 102', 103' in stranding operation as well as in back twisting operation.

The first passage 110, which serves for passing the first strand 102 in stranding operation, connects an offset or peripheral inlet 111 at the upper end side or inlet end side 140 of the stranding element 100, 100' in a path parallel to the rotational axis with a radial outlet 112 at the lower end side or outlet end side 141 of the stranding element 100, 100'.

The second passage 120, which serves for passage of the second strand 103, connects an inlet 121 of the stranding element 100, 100' arranged approximately centrally on the surface 143 of the stranding element 100, 100' in the longitudinal direction of the stranding element 100, 100' in an approximately parallel path to the rotational axis 101 with a radial outlet 122 on the outlet end side 141 of the stranding element 100, 100'. A deflection roller 123 for guiding the second strand 103 is arranged at the inlet 121.

The third passage 130, which serves passage of the first or second strand 102', 103' in back twisting operation, connects a central inlet 131 on the inlet end side 140 in an approximate parallel path to the rotational axis 101 with an outlet 132 arranged on the forward one-third of the surface 143 of the stranding element 100, 100' seen in the longitudinal direction of the stranding element 100, 100'. A deflection roller 133 for guiding the strand 102', 103' is arranged at the outlet 132.

Figure 2:
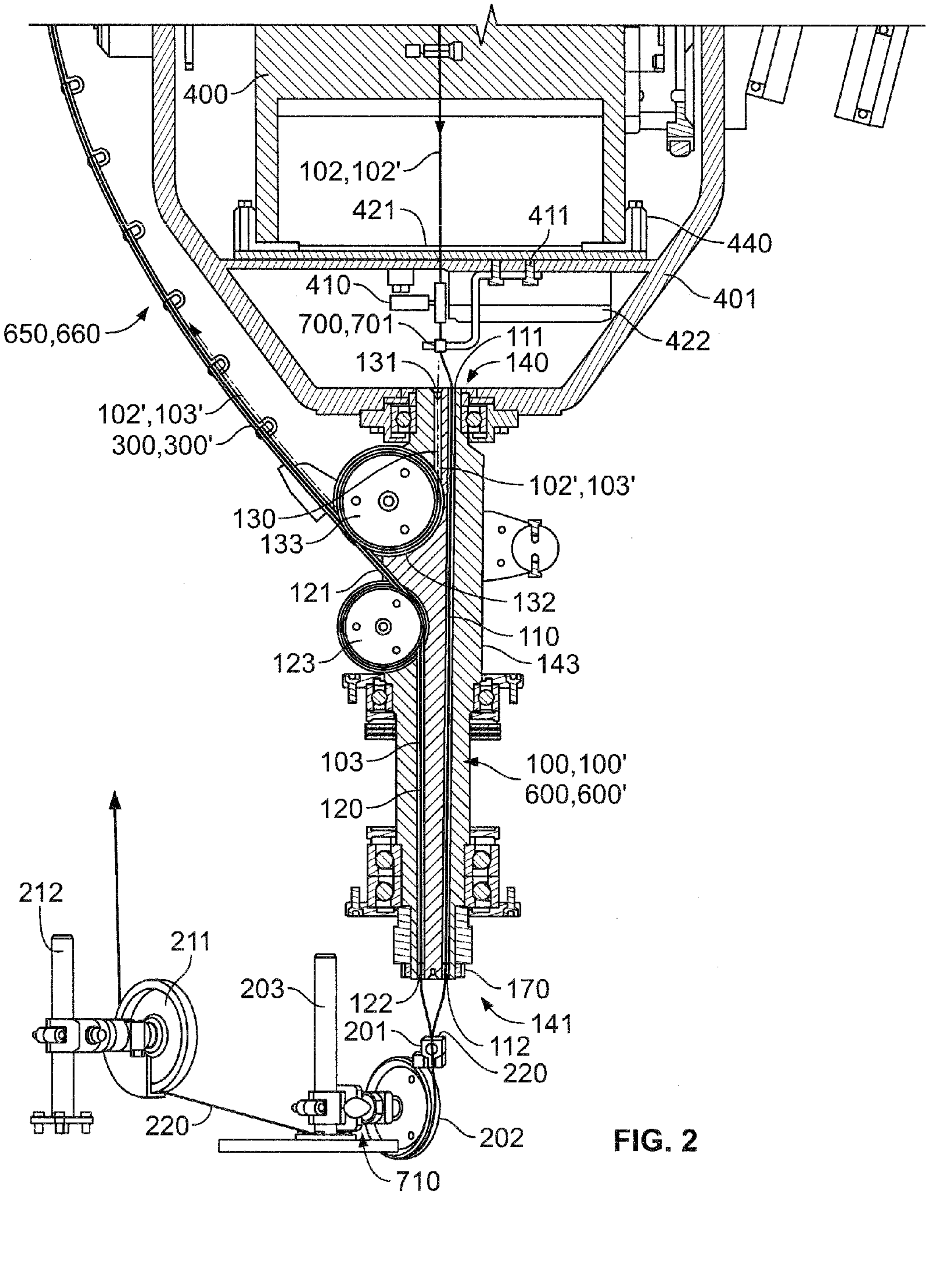
FIG. 2 is an illustration of a lower portion of a vertical rotary flyer payout system with a lower rotary shaft with integrated stranding element as well as deflection rollers for strand guidance, which illustrates the path of a strand when stranding according to a first and/or second embodiment.
Figure 3A:
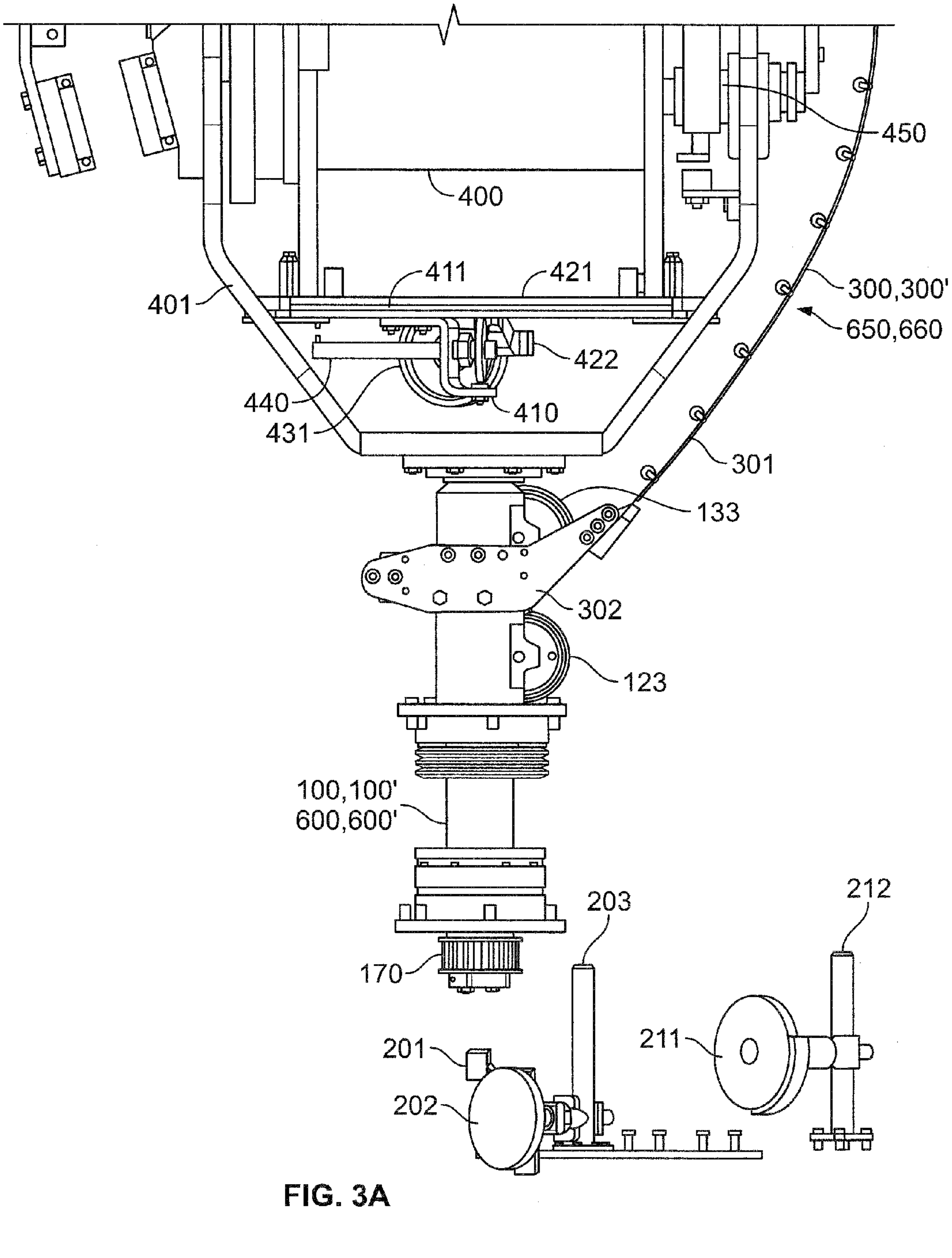
FIGS. 3*a* and 3*b* are illustrations of a lower portion of a vertical rotary flyer payout system with lower rotary shaft (in side view (a) as well as section illustration (b)) with integrated stranding element as well as deflection rollers for strand guidance according to a first and/or second embodiment.
Figure 3B:
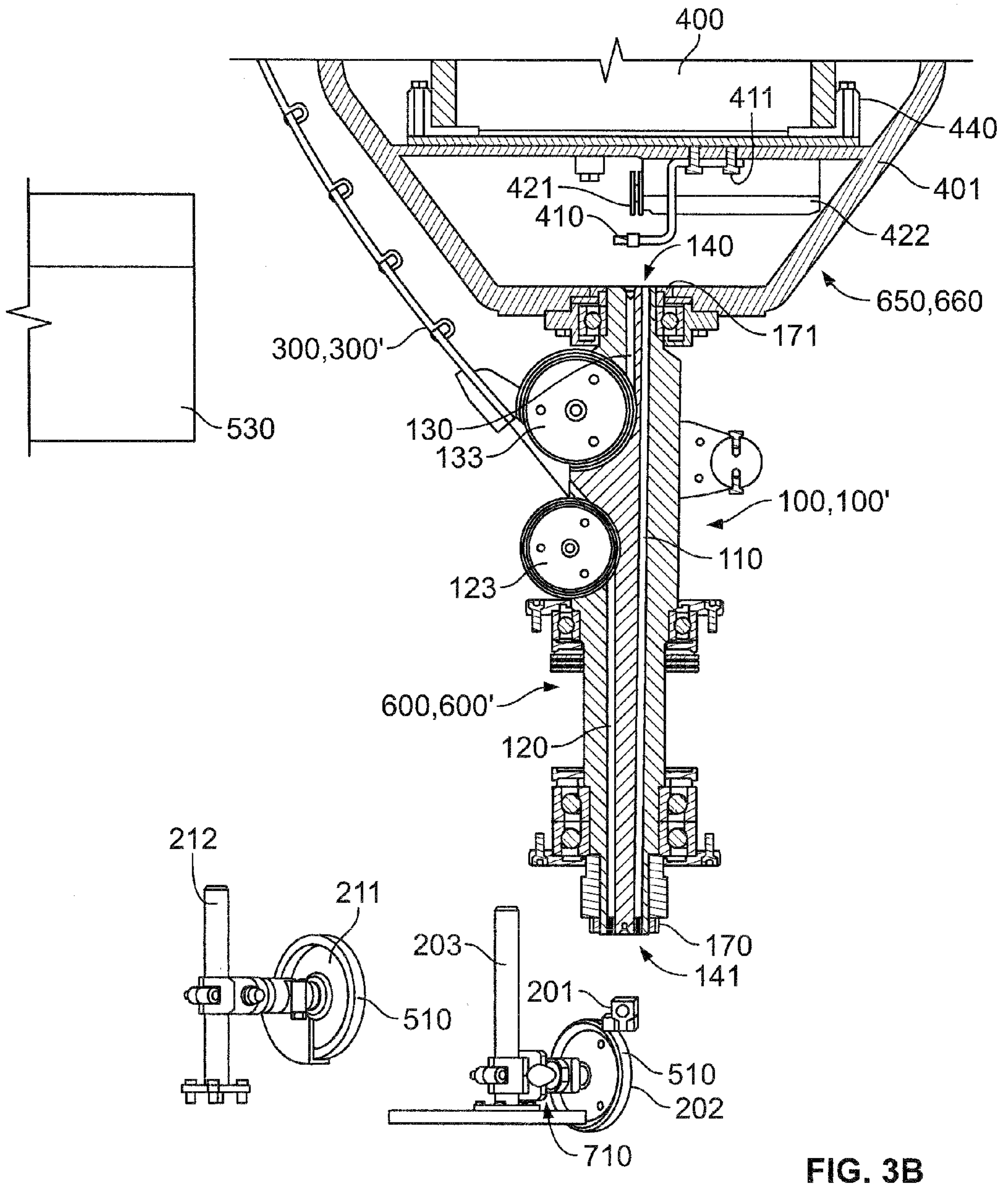
Figure 4:
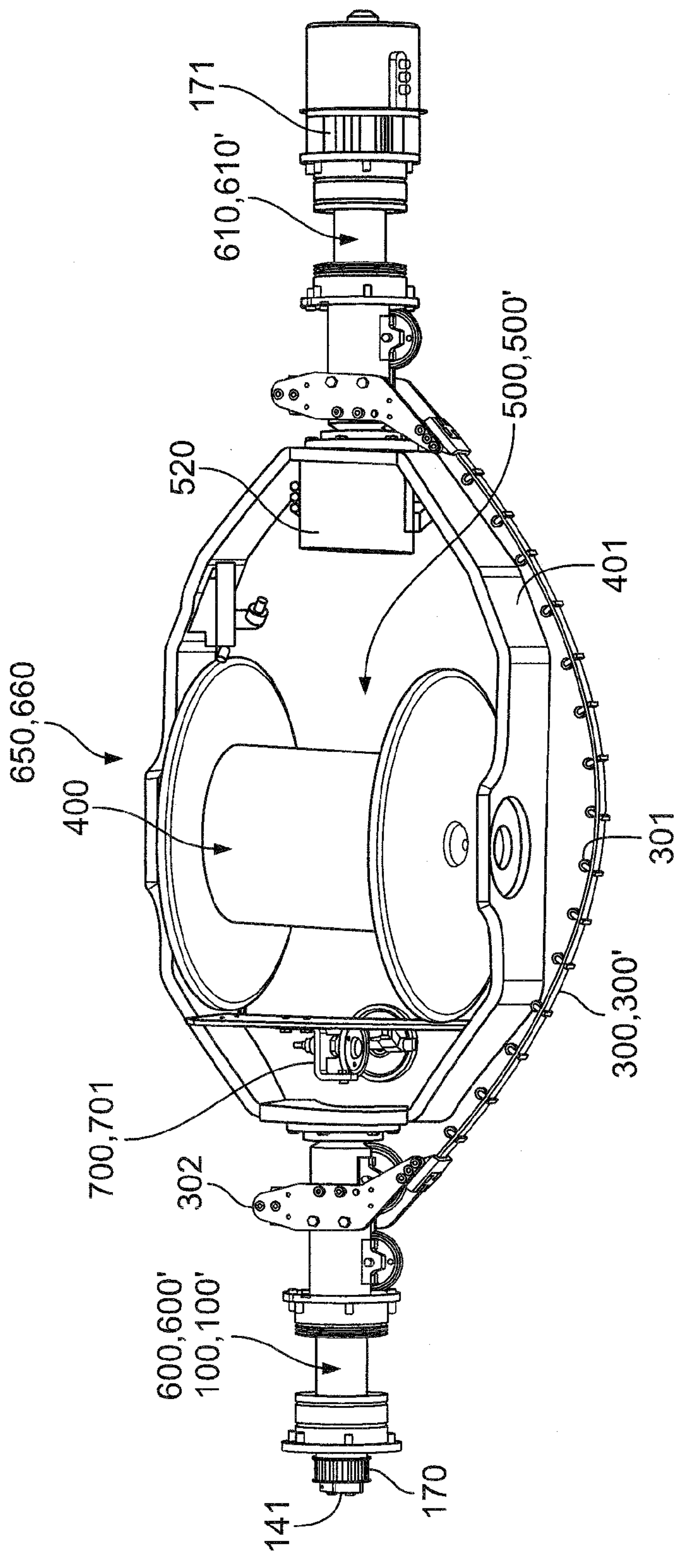
FIG. 4 shows a perspective illustration of a vertical rotary flyer payout system with a stranding element integrated in a lower rotary shaft of the rotary flyer payout system of a first and/or second embodiment.

The path of the strands 102, 103 or 102', 103' through the stranding element 100, 100' in stranding operation as well as in back twisting operation are designated in FIG. 1 with the reference numerals 105, 106 and 107.

A double dot-dashed line 105 illustrates the path of the first strand 102 through the stranding element 100 in the case of stranding. The triple dot-dashed line 106 illustrates the path of the second strand 103 through the stranding element 100, 100' also in the case of stranding.

The quadruple dot-dashed line 107 illustrates the path of the strand 102' or 103' through the stranding element 100, 100' in the case of back twisting.

Embodiment 1:Dancer-Regulated Payout System when Used as Pre-Stranding Assembly or as Stranding Element 100 with Pre-Stranding In the following, the above system 670 when used as a pre-stranding assembly is described (for a three-fold total stranding).

In this case, the second rotary flyer payout system 660 of the flyer driver is decoupled and the payout system 500' is used for "normal" tangential payout.

From here, the second strand 103 is drawn off under dancer regulation with nearly constant tensile force and is guided over the stationary rotary flyer 300' of the second rotary flyer payout system 660. The first rotary flyer payout system 650 is also used only for tangential payout, from whose payout system 500 the first strand 102 is also drawn off in dancer-regulated manner.

The second strand 103 is then passed further over the rotary flyer 300 of the first rotary flyer payoff system 650.

The two strands 102, 103, as described above or in the following in more detail, are then guided and rotated through the stranding element 100, which is part of the lower rotary shaft 600 with the rotary flyer 300 and in this manner guided to the first stranding point 220. Through the rotation of the rotary flyer 300 of the first rotary flyer payout system 650, the strands 102, 103 are stranded, i.e. form a pair.

The pair 220, stranded in this manner, is then passed through a further second stranding point—not illustrated—and receives a second stranding operation.

In addition, the product is passed through a pair stranding assembly, where it receives the third stranding operation when exiting from the rotary flyer of this pair stranding assembly. In this manner, the individual strands receive a back twisting, normally 33%, depending on the stranding velocity in the first stranding operation.

FIG. 1 shows the stranding element 100, 100' as it is employed in the pre-stranding of the first 102 and the second 103 strands.

A double dot-dashed line 105 illustrates the path of the first strand 102 through the stranding element 100 in the case of pre-stranding. The triple dot-dashed line 106 illustrates the path of the second strand 103 in this case. In the case of pre-stranding, as shown by the path 105, the first strand 102 is passed at the inlet end side 140 through the radial inlet 111 into the stranding element 100 or the lower rotary shaft 600.

The further guidance or passage 110 of the first strand 102 runs parallel to the rotational axis 101 of the stranding element 100, until the strand 102 leaves the stranding element 100 via the outlet 112 at the outlet end side 141.

The second strand 103, whose path through the stranding element 100 is designated with the reference numeral 106, is passed through the second passage 120 of the stranding element 100.

It enters into the stranding element 100, 100' through the inlet 121 arranged approximately centrally on the surface 143 of the stranding element 100, 100' seen in longitudinal direction of the stranding element 100, 100'.

The strand 103 passes in an approximately parallel path to the rotational axis 101 and exits at a radial outlet 122 on the outlet end side 141 of the stranding element 100. A deflection roller 123 for guiding the second strand 103 is arranged at the inlet 121, by which the second strand 103 is guided into the stranding element 100.

Embodiment 2:Dancer-Regulated Payout System in Use as Back Twisting Payout or Stranding Element 100, 100' Under Back Twisting In the following, the above system 670 is described in a further application in back twisting operation.

In this case, the two vertical and parallel rotary flyer payout systems 650 and 660 are operated for flyer payout, where the two flyer payout systems are operated simultaneously and in synchronization.

The two payout spools 400, 400' of the two flyer payout systems 650 and 660 are driven by a drive unit 450, coupled here with the respective rotary flyers 300, 300' and the second strand 103' is drawn out under dancer regulation with nearly constant tensile force.

The respective drawn off strands 102' and 103', as described above in detail or will be described below, are rotated with the respective stranding element 100, 100', which is part of the lower rotary shaft 600, 600' and subsequently guided over the respective rotary flyer 300, 300'. Through this, through their rotation, they receive a twisting.

After this, the strands 102' and 103' are passed to a first stranding point—not shown—and receive a first stranding operation.

The product is then passed through a pair stranding assembly, where it receives a second stranding operation when leaving the rotary flyer of this pair stranding assembly. Here, the twisting is either completely or partially twisted back out depending on the back twisting percent or the degree of back twisting present.

FIG. 1 shows the stranding element 100, 100', as it is also employed for back twisting operation. The quadruple dot-dashed line 107 illustrates the path of the strand 102' or 103' through the stranding element 100, 100' in the case of back twisting.

For back twisting, as the path 107 shows, the first 102' or the second 103' strand is passed at the inlet end side 140 through the central inlet 131 into the stranding element 100, 100' or the lower rotary shaft 600, 600'.

The further central passage 130 of the strand 102', 103' runs along the rotational axis 101 of the stranding element 100, 100' for a predetermined distance, until the strand 102', 103' leaves the stranding element 100, 100' over a deflection roller 133 via the outlet 132 in the direction of the rotary flyer 300, 300'.

Embodiment 3:Regulation of the Strand Tension

Embodiment 3 represents a wire or strand tension regulation in the stranding assembly according to the embodiment 1.

The described strand tension regulation can however also be the subject of protection alone without the constructive details of the stranding assembly according to embodiment 1.

The aim of the following embodiment and description of strand tension regulation is to achieve the same strand tension at the stranding point of the two strands when performing stranding or pre-stranding.

The strand tension regulation according to this embodiment should therefore control the different tensions in the two strands, which arise due to the different lengths of the payout paths of the two strands (up to the first stranding point) and the resulting different friction forces on the two strands.

For the purposes of strand tension regulation, the two rotary flyer payout systems 650, 660 are each equipped with a dancer regulator for regulating the drawing of the respective strand, as already described above.

Furthermore, the two payout systems 650, 660 each comprise a device for tensile force measurement or strand tension measurement, in this case a first 700 and a second 701 force sensor, which in drawing direction is arranged directly after the payout position of the respective strand in the corresponding (first and second) rotary flyer payout system 650 660. The first or the second strand 102, 103 is passed over the first or second force sensor 700, 701 and their tensile force or strand tension is measured.

In addition, the stranding assembly comprises a further, in this case a third force sensor 710, which in drawing direction is arranged after the stranding point 200 of the two strands 102, 103. The stranded product 220 (out of the first and second strands 102, 103) is passed over this sensor and its tensile force or strand tension is measured. In the following this is referred to briefly as the product tension or product tensile force.

In the embodiment of the strand tension regulation, a first dancer-regulated payout of the first strand 102 takes place with a predetermined master or nominal drawing force F(nominal) in the rotary flyer payout system 650 used for tangential payout.

The drawing force or strand tension of the first strand 102 is measured directly following the drawing location in the first payout system 650 for adjusting the nominal drawing force of the first strand 102 and for guaranteeing a drawing operation with constant nominal drawing force. The drawing force is measured and correspondingly adjusted (F(nominal) =F(payout 1)) or readjusted (automatically during operation).

In addition, the product tension or tensile force F(product) of the (pre-)stranded product 220 is measured by means of the third force sensor 710.

The drawing force F(payout 2) for the second, dancer-regulated payout of the second strand 103 of the second rotary flyer payout system 660, also used for tangential payout, is then determined as follows:

$$F(\text{payout }2)=F(\text{nominal})-(\text{product tension}-2\times F(\text{nominal})). \quad \text{(Eq. 1)}$$

This determined drawing force for the second strand 103 is then set for the dancer-regulated payout of the second payout system 660 and, analogously with the first payout system 650, is monitored by the second force sensor 701 and optionally (automatically during operation) adjusted or readjusted.

The following numerical examples illustrate the strand tension regulation. A nominal drawing force of F(nominal) =10 N is set at the first dancer regulated payout of the first payout system 650. The force measurement by the third force sensor 710 delivers, for example, a product tensile force of F(product)=27 N.

According to the above equation (Eq. 1), a drawing force for the second, dancer-regulated payout of the second strand 103 F(payout 2)=3 N is determined. The second strand 103 is then drawn out with this drawing force F(payout 2)=3 N. This in return results in F(product)=20 N.

These adjustments of the first and second drawing force with F(payout 1) or F(nominal) and F(payout 2) make for uniform strand tension when stranding and therefore a qualitatively higher value product.

The drawing force for the second strand 103 is varied (reduced) until the value of 2×F(nominal) results for the product tension.

Finally, it should again be mentioned that the described assembly is highly flexible, due to the different application possibilities (stranding, back twisting, tension regulation).

A fabrication of strand pairs for UTP, FTP, STP and S/STP for the categories 5, 5+, 6 and possibly 7 can be increased by more than 30%.

The application as a normal back twisting unit or assembly (embodiment 2) for high value products, such as category 8, four-fold and bus lines is also possible, as is a main stranding with back twisting of 0 to 100%.

The invention claimed is:

1. An apparatus for stranding long winding material comprising:

a substantially cylindrical rotary body defining a longitudinal, rotational axis and including at least one first passage for guiding a first winding material through the substantially cylindrical rotary body and at least one second passage for guiding a second winding material through the substantially cylindrical rotary body;

wherein the at least one first passage connects a first offset inlet, which is radially spaced from the rotational axis of the substantially cylindrical rotary body on a first end side of the substantially cylindrical rotary body, with a first offset outlet, which is radially spaced from the rotational axis of the substantially cylindrical rotary body, on a second end side of the substantially cylindrical rotary body, opposite the first end side; and the at least one second passage connects a second inlet, which is different than the first inlet and arranged on an outer surface of the substantially cylindrical rotary body, said outer surface extending between the two end sides of the substantially cylindrical rotary body, with a second offset outlet, which is radially spaced from the rotational axis of the substantially cylindrical to rotary body, different than the first offset outlet, and arranged on the second end side or the first end side of the substantially cylindrical rotary body; and wherein the at least one first passage and the at least one second passage are different.

2. The apparatus of claim 1, comprising one, two or more first passages and/or with one, two or more second passages, each for guiding a further winding material through the cylindrical rotary body.

3. The apparatus of claim 1, wherein a second offset outlet of a further second passage lies opposite the second offset outlet of the at least one second passage.

4. The apparatus of claim 1, wherein the second offset outlet of the second passage and the first offset outlet of the first passage are arranged on the same end side of the substantially cylindrical rotary body, in particular such that the two offset outputs have the same radial distance from the rotational axis of the substantially cylindrical rotary body and more particularly are opposed by 180°.

5. The apparatus of claim 1, wherein the first and/or second passage run substantially parallel to the rotational axis of the substantially cylindrical rotary body, in particular at the same radial distance.

6. The apparatus of claim 1, wherein the substantially cylindrical rotary body is part of a rotary shaft of a rotary flyer, in particular a rotary flyer payout system, and/or rotates with a rotary flyer, in particular a rotary flyer payout system, and/or is connected to rotate commonly.

7. The apparatus of claim 1, wherein a guiding device for guided input of the second winding material is arranged at the second inlet, in particular a deflection roller.

8. The apparatus of claim 7, further comprising a third passage for guiding a third winding material through a substantially cylindrical rotary body, wherein the third passage connects a third central inlet on the second or first end side of the rotary body with a third outlet arranged on the surface of the rotary body extending between the two end sides.

9. The apparatus of claim 8, wherein a guiding device for guided output of the third winding material is arranged at the third outlet, in particular a deflection roller.

10. The apparatus of claim 7, wherein the first and the third and/or the second and the third and/or the first, the second and the third passage are substantially parallel to one another and/or to the rotational axis of the substantially cylindrical rotary body.

11. The apparatus of claim 1, wherein the substantially cylindrical rotary body is made of one of steel or aluminum.

12. The apparatus of claim 1, which is employed for stranding, in particular a pre-stranding, of a first winding material, in particular a first strand, and the second winding material, in particular a second strand, especially metallic first and second winding materials, such as wires, lacings, insulated cables, wherein the first winding material is guided through the first passage and the second winding material is guided through the second passage and are stranded after passing through the substantially cylindrical rotary body at a stranding point.

13. The apparatus of claim 12, which is employed for stranding, in particular for pre-stranding of the first and the second winding material, wherein the second winding material prior to passing through the second passage in drawing direction is guided over a rotary flyer of a rotary flyer payout system and/or wherein the first winding material prior to passing into the first passage in drawing direction is paid out by a payout system of the rotary flyer payout system as a tangential payout.

14. The apparatus of claim 13, which is employed for stranding, in particular for pre-stranding, of the first and the second winding material, wherein the second winding material prior to being guided in drawing direction over the rotary flyer of the rotary flyer payout system is paid out by a further payout system of a further rotary flyer payout system as a further tangential payout.

15. The apparatus of claim 1, which is employed for back twisting of the third winding material, in particular a third strand, wherein the third winding material is guided through a third passage and after passing through the substantially cylindrical rotary body is guided over a rotary flyer of the rotary flyer payout system through which the third winding material receives a back twisting.

16. The apparatus of claim 15, which is employed for back twisting of a third winding material, wherein the third winding material prior to passing through the substantially cylindrical rotary body in drawing direction is paid out by a payout device of the rotary flyer payout system.

17. The apparatus of claim 1, further comprising a first force measuring device, in particular a first force sensor for measuring a tensile force and/or tension in a winding material, through which the first winding material is guided before passing through the first passage of the substantially cylindrical rotary body, and a third force measuring device, in particular a third force sensor, also for measuring a tensile force and/or tension of a winding material, through which a product, stranded out of the first and second winding material, is guided after passing through the substantially cylindrical rotary body.

18. The apparatus of claim 17, further comprising a second force measuring device, in particular a second force sensor, for measuring a tensile force and/or tension of a winding material, through which the second winding material is guided before passing through the second passage of the substantially cylindrical rotary body.

19. The apparatus of claim 17, when employed for a detection and/or regulation of a winding material tension and/or drawing force for a winding material, in particular for detecting a set drawing force of a second winding material and/or regulating a second drawing force of a second winding material;

wherein the first drawing force of the first winding material is measured with the first force measuring device and/or a second drawing force of the second winding material is measured with the second measuring device;

wherein the tensile force in the stranded product is measured with the third measuring device; and wherein the set drawing force of the second winding material is determined and/or the second drawing force of the second winding material is regulated by using the first drawing force of the first winding material and/or the second drawing force of the second winding material and the tensile force in the stranded product.

20. The apparatus of claim 1, wherein a passage through the rotary body is one of a longitudinal bore or a longitudinal groove.

* * * * *